W. H. VOLCK.
PROCESS OF MAKING LIME SULFUR SOLUTION.
APPLICATION FILED NOV. 13, 1911.
1,043,276.   Patented Nov. 5, 1912.
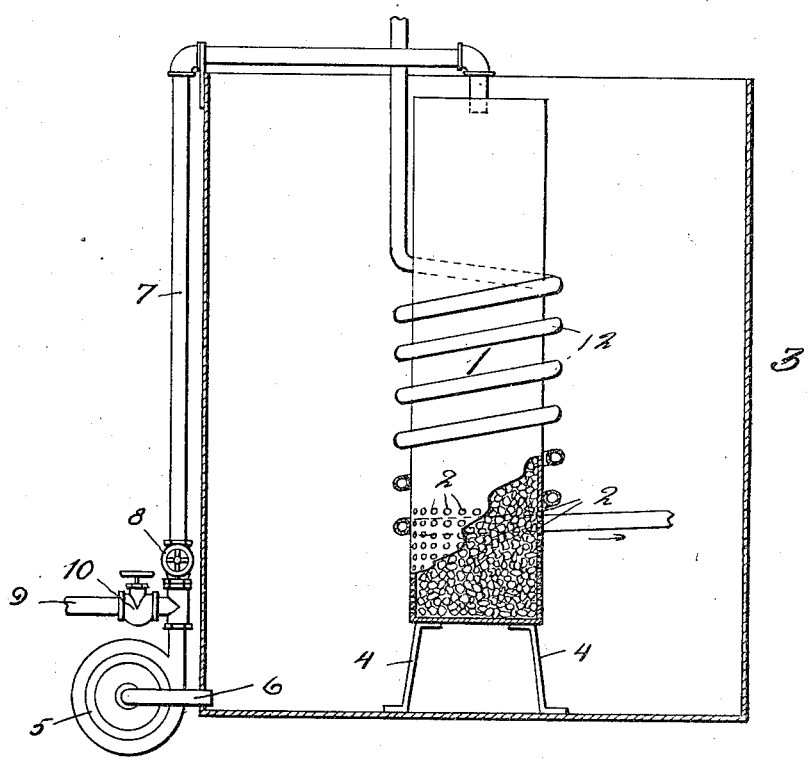
Witnesses
Inventor
William H. Volck.
By C. L. Parker
Attorney

UNITED STATES PATENT OFFICE.

WILLIAM H. VOLCK, OF WATSONVILLE, CALIFORNIA.

PROCESS OF MAKING LIME-SULFUR SOLUTION.

1,043,276.  Specification of Letters Patent.  Patented Nov. 5, 1912.

Application filed November 13, 1911. Serial No. 660,143.

*To all whom it may concern:*

Be it known that I, WILLIAM H. VOLCK, a citizen of the United States, residing at Watsonville, in the county of Santa Cruz and State of California, have invented certain new and useful Improvements in Processes of Making Lime-Sulfur Solution, of which the following is a specification.

This invention relates to the production of the so called "lime and sulfur solution" and particularly to a novel process for its manufacture.

An important object of this invention is to provide a novel process to produce "lime and sulfur solution," whereby the manufacture is rendered expeditious and continuous, and the cost reduced by economizing in the use of sulfur.

Other objects and advantages of this invention will be apparent during the course of the following description.

In the accompanying drawing forming a part of this specification and in which reference characters are employed to designate parts throughout the same, the figure is a side elevation, partly in section, of an apparatus, suitable for carrying out my process.

In the ordinary process of making "lime and sulfur solution," slaked lime is mixed with powdered sulfur and a suitable amount of water. The mass is heated until the lime combines with the sulfur, and the water dissolves this product, forming "lime and sulfur solution." This process cannot be carried on profitably, owing to the large percentage of sulfur that is wasted. The sulfur is generally used in excess and being powdered, such excess is lost through mixture with the insoluble lime and sulfur compounds which form at the same time with the solution. These insoluble compounds have no value and form a mass which must be removed and hence the loss of the excess of sulfur forming a part of it.

In my present process, just the correct amount of sulfur is made to combine with a certain amount of lime, by employing the sulfur in excess in the form of large lumps, placing it in contact with the lime, and subjecting the mass to the action of water. By heating this mass in the presence of moisture, the exterior of the lumps of sulfur, being in contact with the lime, first combines with it, whereby after the lime has entered into combination, the excess of sulfur still remains in the lump form and may be treated with a further amount of lime. The water is circulated about the lump sulfur and lime, to dissolve and take into solution the combined lime and sulfur, thus forming "lime sulfur solution."

Reference being had to the drawing, 1 designates a vertically disposed receptacle or shell for holding the large lumps of sulfur and lime. This receptacle or shell has its upper end formed open and the lower portion of its periphery provided with perforations 2. The shell 1 is supported concentrically in an outer cylindrical shell or casing 3 by legs 4, as shown. The bottom of the receptacle 1 is spaced from the bottom of the shell 3.

The numeral 5 designates a rotary pump of any well known or preferred type, which has communication with the lower end of the outer shell or casing 3, through a return pipe 6. A supply pipe 7 has communication with the feed end of the pump 5 and extends upwardly to discharge into the receptacle or shell 1. The supply pipe 7 is provided with a valve 8. A discharge pipe 9 has connection with the pipe 7 near the pump 5 and a valve 10 is provided upon the pipe 9.

I provide heating means in the form of a steam coil 12, which surrounds the receptacle or shell 1, as shown. Steam is supplied into this coil at its upper end and discharged from the lower end thereof.

In carrying out my process, large lumps of sulfur are fed into the receptacle 1 and a comparatively small amount of lime is introduced into the receptacle to mix with the lump sulfur. The valves 8 and 10 are now opened to supply water from the pipe 9, through pipe 7, into the upper end of the receptacle. This water percolates through the lump sulfur and lime and passes through perforations 2, into the outer shell 3. After a sufficient amount of water has accumulated in the outer shell, for example, when water rises to the bottom of the receptacle 1, the valve 10 is closed. The pump being started now draws water from the bottom of the outer shell 3, discharges the same into the upper end of receptacle 1, and thus keeps up a continuous circulation of the percolating water through the lump sulfur and lime. Heat is then applied to the receptacle to raise the temperature of the sulfur and lime to about 100° C. to aid in the combining of the sulfur and lime. The lime in the presence of water, engages the exterior of the lumps of sulfur and in the presence of heat combines with the sulfur until all of the lime is consumed. The greater portion of the sulfur is left behind in the lump form and may be again heated with the lime. The water percolating through the lump sulfur and lime dissolves the combined lime and sulfur, forming the "lime and sulfur solution". After all the combined lime and sulfur has gone into solution, the valve 8 is closed, valve 10 opened, and the pump operated to discharge the "lime and sulfur solution" into a suitable receptacle (not shown), through pipe 9.

I wish it understood that the form of my invention herewith shown and described is to be taken as a preferred example of the same, and that certain changes may be made therein without departing from the spirit of the invention or the scope of the subjoined claims.

Having thus described my invention, I claim:—

1. The herein described process which consists in subjecting lump sulfur to the action of lime, and circulating water through the mass to dissolve the combined sulfur and lime, while heating the mass.

2. The herein described process which consists in holding lump sulfur and lime in contact, preventing the escape of the lump sulfur while causing water to percolate through the mass, which is simultaneously subjected to the action of heat.

3. The herein described process, which consists in placing lump sulfur and lime in a receptacle provided with perforations too fine to permit the lump sulfur to pass through, and flowing water through the mass in the receptacle to dissolve the combined sulfur and lime, while heating the mass.

4. The herein described process which consists in placing a relatively small amount of lime with lump sulfur, causing water to circulate through the mass for a number of times, and simultaneously subjecting the mass to the action of heat.

5. The herein described process, which consists in heating lump sulfur while subjecting it to the action of a solution of lime in water, for causing all of the lime to combine with a portion of the lump sulfur and leaving the excess of sulfur in the lump form.

6. The herein described process, which consists in heating a mass comprising lump sulfur in excess and lime, while subjecting it to the action of water, for causing all of the lime to combine with a portion of the lump sulfur and leaving the excess of sulfur in the lump form.

7. The herein described process, which consists in heating a mass comprising lump sulfur in excess and lime, while subjecting it to the action of circulating water, for causing all of the lime to combine with a portion of the lump sulfur and leaving the excess of sulfur in the lump form, and withdrawing the lime and sulfur solution obtained.

8. The herein described process which consists in placing lump sulfur and lime in a receptacle provided with perforations too fine to permit the lump sulfur to pass through, causing water to percolate through the mass, and simultaneously subjecting the mass to heat.

In testimony whereof I affix my signature in presence of two witnesses.

WILLIAM H. VOLCK.

Witnesses:
 CLAY W. SEEVERS,
 GEO. W. SMITH.